United States Patent [19]
Fritch et al.

[11] Patent Number: 6,105,132
[45] Date of Patent: Aug. 15, 2000

[54] COMPUTER NETWORK GRADED AUTHENTICATION SYSTEM AND METHOD

[75] Inventors: Daniel Gene Fritch, Orem; Tammy Anita Green, Pleasant Grove; Roger R. Schell, Orem, all of Utah

[73] Assignee: Novell, Inc., Provo, Utah

[21] Appl. No.: 08/802,764

[22] Filed: Feb. 20, 1997

[51] Int. Cl.⁷ .................................................. G06F 12/14
[52] U.S. Cl. ...................... 713/167; 713/155; 713/168; 713/201
[58] Field of Search ........................... 709/229; 713/201, 713/200, 155, 167, 168; 380/25

[56] References Cited

U.S. PATENT DOCUMENTS

| | | | |
|---|---|---|---|
| 3,916,385 | 10/1975 | Parmar et al. | 340/172.5 |
| 4,104,721 | 8/1978 | Markstein et al. | 364/200 |
| 4,135,240 | 1/1979 | Ritchie | 364/200 |
| 4,177,510 | 12/1979 | Appell et al. | 364/200 |
| 4,328,542 | 5/1982 | Anastas et al. | 364/200 |
| 4,442,484 | 4/1984 | Childs, Jr. et al. | 364/200 |
| 4,498,131 | 2/1985 | Bratt et al. | 364/200 |
| 4,498,132 | 2/1985 | Alhstrom et al. | 364/200 |
| 4,584,639 | 4/1986 | Hardy | 364/200 |
| 4,621,321 | 11/1986 | Boebert et al. | 364/200 |
| 4,701,840 | 10/1987 | Boebert et al. | 364/200 |
| 4,713,753 | 12/1987 | Boebert et al. | 364/200 |
| 4,757,533 | 7/1988 | Allen et al. | 380/25 |
| 4,809,160 | 2/1989 | Mahon et al. | 364/200 |
| 4,858,117 | 8/1989 | DiChiara et al. | 364/200 |
| 4,919,545 | 4/1990 | Yu | 380/25 |
| 4,926,476 | 5/1990 | Covey | 380/4 |
| 4,941,175 | 7/1990 | Enescu et al. | 308/4 |
| 4,956,769 | 9/1990 | Smith | 364/200 |
| 4,962,533 | 10/1990 | Krueger et al. | 380/25 |
| 4,984,272 | 1/1991 | McIlroy et al. | 380/25 |
| 5,023,773 | 6/1991 | Baum et al. | 364/280 |
| 5,196,840 | 3/1993 | Leith et al. | 340/825.3 |
| 5,202,997 | 4/1993 | Arato | 395/725 |
| 5,204,961 | 4/1993 | Barlow | 395/725 |
| 5,247,517 | 9/1993 | Ross et al. | 370/85.8 |
| 5,276,444 | 1/1994 | McNair | 340/825.33 |
| 5,287,519 | 2/1994 | Dayan et al. | 395/700 |
| 5,313,637 | 5/1994 | Rose | 395/725 |
| 5,341,422 | 8/1994 | Blackledge, Jr. et al. | 380/4 |
| 5,349,642 | 9/1994 | Kinngdon | 380/25 |
| 5,355,474 | 10/1994 | Thuraisngham et al. | 707/9 |
| 5,444,850 | 8/1995 | Chang | 395/200.1 |

OTHER PUBLICATIONS

"The SSL Protocol", Anon., *Netscape Communications Corporation*, 1997.

"LDAP & X.500: Road Map & FAQ", J. Hodges, Distributed Computing and Communication Services, Standford University, Feb. 11, 1997.

"Novera Software, Inc. Announces Support for LDAP Protocol and The Netscape One Platform", PRNewswire, Feb. 10, 1997.

"SLDAP: Secure Lightweight Directory Access Protocol", Anon., *Chromatix, Inc.*, Aug. 12, 1996.

European Search Report, European Patent Office, Oct. 29, 1991.

(List continued on next page.)

*Primary Examiner*—Gilberto Barron, Jr.
*Attorney, Agent, or Firm*—Computer Law++

[57] ABSTRACT

Methods and systems are provided which control access by a task to an information object in a computer system. The task is authenticated by an authentication procedure to act on behalf of a user. A computer-implemented method includes associating an authentication grade with the authentication procedure, identifying at least one clearance level previously assigned to the user by a clearance administrator, and identifying at least one classification level previously assigned to the information object by a classification administrator. The method then determines the access rights of the task with respect to the information object based at least on the authentication grade, the clearance level, and the classification level. Information about the user's connection to the system may also be considered. The results of the determination are distributed to promote consistent access; rights throughout the system.

40 Claims, 6 Drawing Sheets

OTHER PUBLICATIONS

"Implementing Multilevel Security by Violation Privilege", J. M. Carroll, *Computers &Security*, vol. 7, No. 6, Dec. 1988, pp. 563–573.

"System V/MLS Labeling and Mandatory Policy Alternatives", C. W. Flink II et al., *AT &T Technical Journal*, No. 3, May/Jun. 1988, pp. 53–64.

"Reasoning About Knowledge in Multilevel Secure Distributed Systems", J. I. Glasgowm et al., *Proceedings 1988 IEEE Symposium on Security and Privacy*, Apr. 18–21, 1988, Oakland, California, pp. 122–128.

"Exploiting the Dual Nature of Sensitvity Labels", J. P. L. Woodward, *Proceedings 1987 IEEE Symposium on Security and Privacy*, Apr. 27–29, 1987, Oakland, California, pp. 23–30.

Andrew S. Tanenbaum, *Operating Systems: Design and Implementation*, Prentice–Hall, Inc., 1987, pp. 289–297.

"Department of Defense Trusted Computer System Elevation Criteria", DoD 5200.28–STD, Dec. 26, 1985.

H. McGilton et al., *Introduction the UNIX System*, McGraw–Hill Book Co., 1983, pp. 75–78.

"Integrity Consideration for Secure Computer Systems", The Mitre Corporation, Deputy for Command and Management Systems, Apr. 1977.

Additional Information Regarding MAC Systems.

| 0, 1 | 2-5 | 6, 7 | 8-11 | 12-23 | 24-31 |
|---|---|---|---|---|---|
| TYPE, SIZE | LEVELS | RESERVED | SINGLETON CATEGORIES | SECRECY CATEGORIES | INTEGRITY CATEGORIES |
| 82 | 84 | 86 | 88 | 90 | 92 |

*FIG. 6*

COMPUTER NETWORK GRADED AUTHENTICATION SYSTEM AND METHOD

FIELD OF THE INVENTION

The present invention helps protect the secrecy and integrity of information stored on a computer system when a task acting on behalf of a user seeks access to the information. More particularly, the invention helps provide consistent control over access to information on a multi-server network in view of a user's clearance level(s), the information's classification level, a network-wide policy definition, and an authentication grade which reflects the credibility of the procedure used to authenticate a task that seeks to access the information.

TECHNICAL BACKGROUND OF THE INVENTION

"Authentication" involves verifying the correctness of security characteristics to prevent unauthorized changes in the secrecy and/or integrity of information. A variety of authentication procedures and security policies are used to help control access to information stored on networks and other computer systems. Many sources of information about computer system security are available. One source is U.S. Pat. No. 5,349,642, Method and Apparatus for Authentication of Client Server Communication, which is incorporated herein by reference.

The available approaches for protecting the security of information fall generally into two groups, depending on the discretion given or denied to routine users of the computer system. Perhaps the most common of these two approaches to security is known generally as "discretionary access control" or "DAC." DAC is based mainly on determining a user's identity and any relevant groups to which the user belongs. DAC may be implemented using access control lists, capability lists, owner-group-world flags, cleartext names, passwords, biometric scans, or other means.

DAC is discretionary in that the access rights given to a user may be transferred by that user to other users. DAC allows authorized users to change access rights, to grant group membership to other users, or to otherwise transfer rights directly or indirectly.

By contrast, approaches which are known generally as "mandatory access control" or "MAC" do not allow such transfers or changes in access rights. MAC limits access based on the user's clearance level(s) and on the sensitivity of the information, which is reflected in the information's classification level. Clearance and classification levels are determined by one or more system administrators or other security personnel and are not subject to routine change by users. MAC is one of the requirements for systems at the B1, B2, B3, and A1 security levels set forth in the United States Department of Defense Trusted Computer System Evaluation Criteria (known as the "Orange Book").

Both DAC and MAC approaches are sometimes enhanced to reflect knowledge about the user's connection to the system. For instance, tables or filters may be used to further restrict access based on the network file system setup, on whether access is attempted with World Wide Web or File Transfer Protocol software, on UNIX rhosts lists, on the port number, the device used, the LAN segment, the packet addresses, and other characteristics of the connection.

The wide variety of identification, authentication, and security techniques and equipment in use creates problems for network and other system administrators. The degree of administrative difficulty and the risk of errors grows rapidly as the number of computers involved and the number of security options for each computer multiply.

Moreover, the effective security of a system may be inadvertently weakened when the system is enhanced to allow new means of access. For instance, if an additional server computer is placed in the system, that server typically defines its own access controls based on its local tables, filters, software and hardware. Unless detailed preventive steps are taken, different servers can provide the same user with different degrees of access to the same information. This leads at best to administrative complexity, and in the worst case allows unauthorized access to sensitive information.

Similar problems arise when two networks are initially connected. One current approach requires that everyone using the combined system conform with the strictest authentication procedure previously in use on either system. But this is not always feasible, and the resulting new barriers may unnecessarily restrict access to information that is not especially sensitive. Under another approach the combined system uses the weakest authentication procedure that was previously in use on either system. This does not impose unnecessary new barriers, but it may place sensitive information at risk.

Thus, it would be an advancement in the art to provide a novel system and method for providing a consistent access policy in a computer network.

It would be an additional advancement to provide such a system and method which combines useful aspects of the DAC and MAC approaches to security with information about the authentication procedures(s) used on the network.

Such a method and system are disclosed and claimed herein.

BRIEF SUMMARY OF THE INVENTION

The present invention provides methods and systems for managing the access of information objects by a task operating on behalf of a user of a network or other computer system. In one embodiment, the task is first authenticated by an authentication procedure which has an associated authentication grade. Information is also gathered about the user's clearance level(s), the information's classification level, and the user's connection to the system. The invention combines the novel approach of grading authentication procedures with known but useful aspects of the DAC approach to security (such as access control lists) and other known but useful aspects of the MAC approach (such as clearance and classification levels).

The read-write access rights of the task with respect to the information object are based at least on the authentication grade, the clearance level(s), and the classification level. The authentication grade may be represented in an authentication grade label which is an instance of a more general label and is stored with a security policy on a server computer. The classification level may be similarly represented in a classification label which is also an instance of the general label; the classification label is stored with the information object or otherwise associated with that object. The clearance level(s) may likewise be similarly represented in one or more clearance labels, each of which is an instance of the general label and is stored with or otherwise associated with the task and/or user.

The effective clearance label is generated based on the clearance label(s) and the authentication grade label. The effective clearance label may be part of a credential which may also contain a digital user signature of the data contained therein. The effective clearance label (but not the signature) may be distributed to promote consistency of access rights throughout the system.

The task may be a "trusted task" which is assigned a nontrivial effective clearance range defined by two task effective clearance labels having different values. Or the task may be assigned a single effective clearance label which defines a trivial effective clearance range. In order for a task to be "trusted," multiple clearance levels must be associated with the corresponding user and/or with the task itself, with an indication that more than one level may be assumed at a time.

The access rights of the task with respect to the information object are determined by comparing the task effective clearance label(s) with the information object label in view of a policy, such as a policy that implements the familiar Biba interpretation of the Bell-LaPadula model. Comparison may include DAC constraints and/or determining whether levels dominate one another.

Read and write access may be granted or allowed if and only if a particular authentication procedure is used by the task. Alternatively, all authentication procedures may result in equal access rights. In the general case, however, use of some authentication procedures will provide greater access rights to at least some information objects than the rights provided when the task uses other authentication procedures.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 6 is a diagram illustrating one of the suitable formats of a general label structure according to the present invention.

DETAILED DESCRIPTION OF THE PREFERRED EMBODIMENTS

The present invention relates to a method and system for controlling access to information objects which are stored on, or accessible through, a computer network or other computer system. Information objects include, without limitation: directory service database partitions; file system volumes; hierarchical database components; Novell Directory Services components such as containers, leaves, objects, and attributes; relational database components such as tables; file system directories; and files.

Computer networks which may be configured according to the invention include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 1:
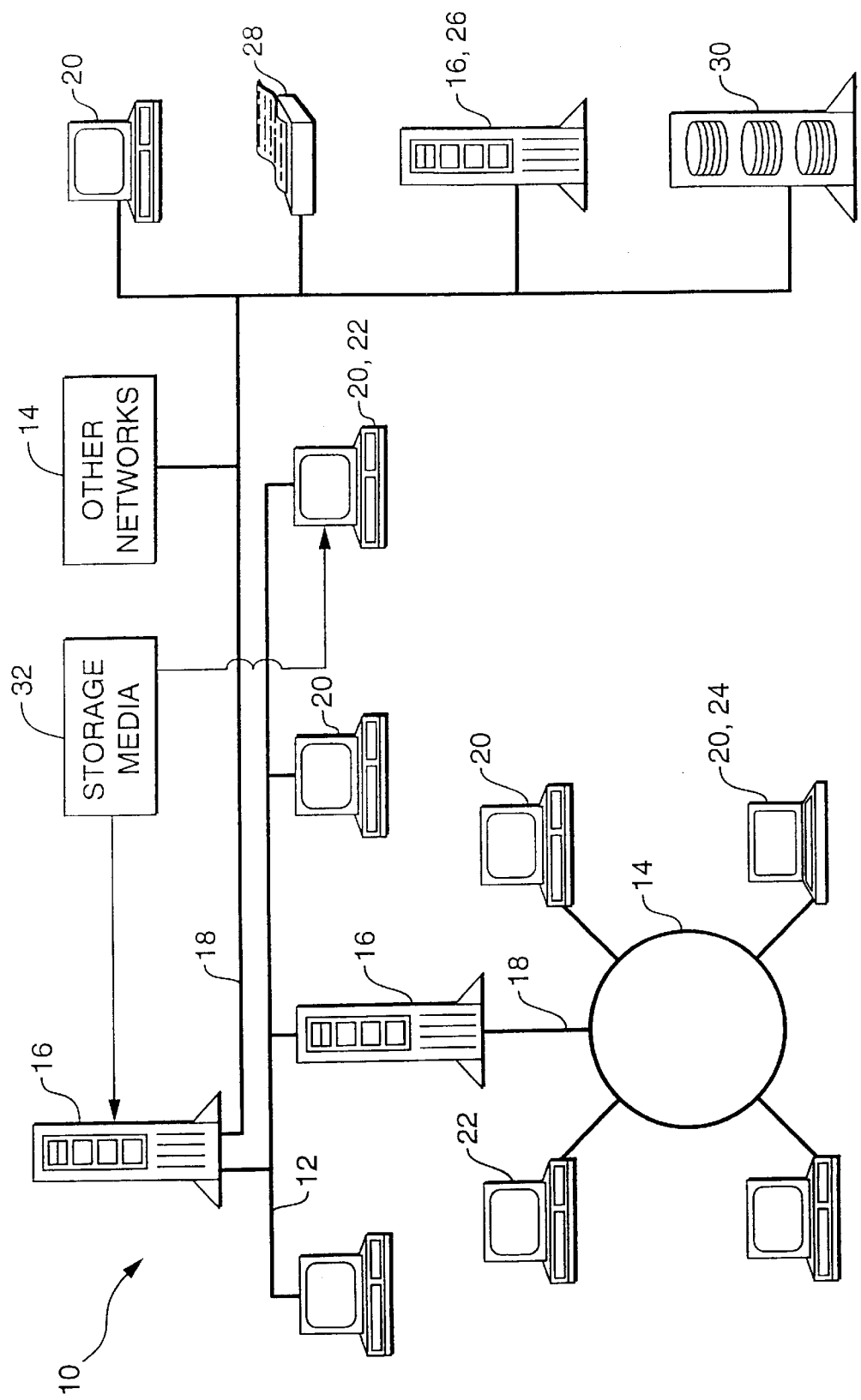
FIG. 1 is a diagram illustrating a computer network which is one of many computer systems suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.). In alternative embodiments, the network includes NetWare Connect Services, VINES, Windows NT, Windows 95, LAN Manager, or LANtastic network operating system software and/or an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The network 10 may include a local area network 12 which is connectable to other networks 14, including other LANs or portions of the Internet or an intranet, through a gateway or similar mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory service providers or name servers, as software component servers, or as a combination thereof. The servers 16 may be uniprocessor or multiprocessor machines. The servers 16 and clients 20 each include an addressable storage medium such as random access memory and/or a non-volatile storage medium such as a magnetic or optical disk.

Suitable network clients 20 include, without limitation, personal computers 22, laptops 24, workstations 26, and dumb terminals. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. A given computer may function both as a client 20 and as a server 16; this may occur, for instance, on computers running Microsoft Windows NT software. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform information object access management steps of the present invention substantially as described herein.

Figure 2:
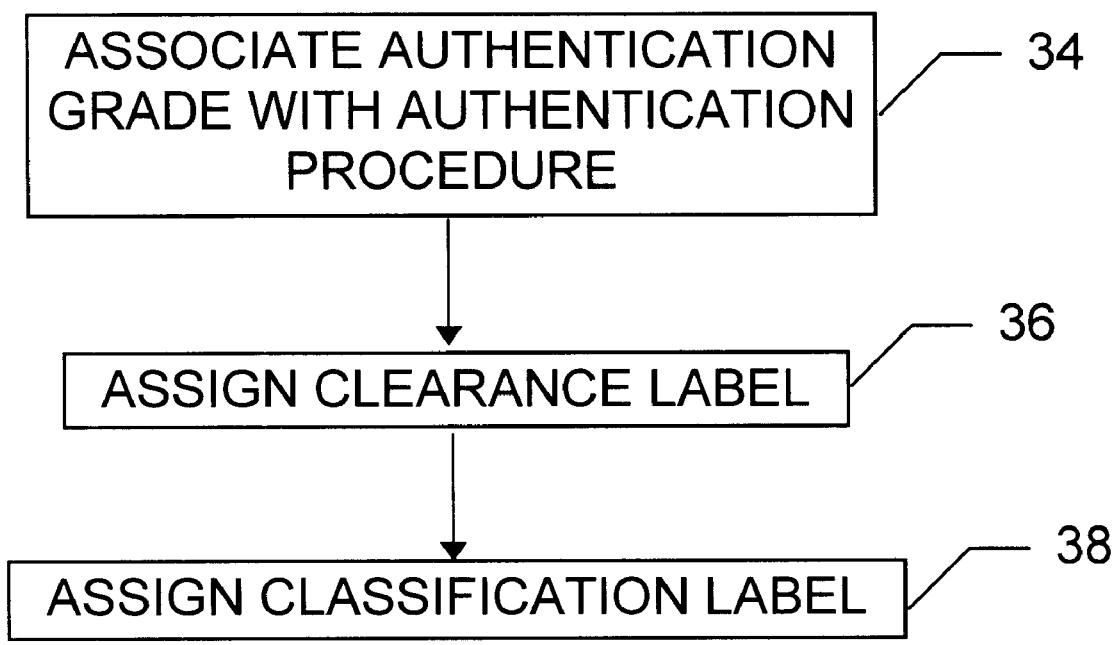
FIG. 2 is a flowchart illustrating a method for configuring part or all of a computer system according to the present invention.

FIG. 2 illustrates a method of the present invention for configuring a computer system such as the network 10, or a portion of such a system. During an associating step 34, one or more authentication procedures used with the system 10 (FIG. 1) are associated with one or more authentication grades and a partial ordering is imposed on the authentication grades. Partial ordering is discussed below in connection with FIGS. 4 and 5.

The associating step 34 is adaptable to meet the needs of different systems 10. According to one method of the invention the associating step 34 associates a plurality of authentication procedures with the same authentication grade. Under another method, each of at least two authentication procedures is associated with its own distinct authentication grade.

Various criteria may be used when deciding which grade to associate with a given authentication procedure. If one authentication procedure has stronger cryptography than another authentication procedure, the associating step 34 may associate a higher authentication grade with the authentication procedure that has stronger cryptography. If one authentication procedure reviews a user identity certificate and another authentication procedure does not, the associating step 34 may associate a higher authentication grade with the authentication procedure that reviews the user identity certificate. If one authentication procedure requires a hardware token and another authentication procedure does not, the associating step 34 may associate a higher authentication grade with the authentication procedure that requires the hardware token. If one authentication procedure verifies that trusted hardware and/or trusted software is in use and another authentication procedure does not, the associating step 34 may associate a higher authentication grade with the authentication procedure that verifies such use. Other criteria familiar to those of skill in the art may also be used.

Figure 4:
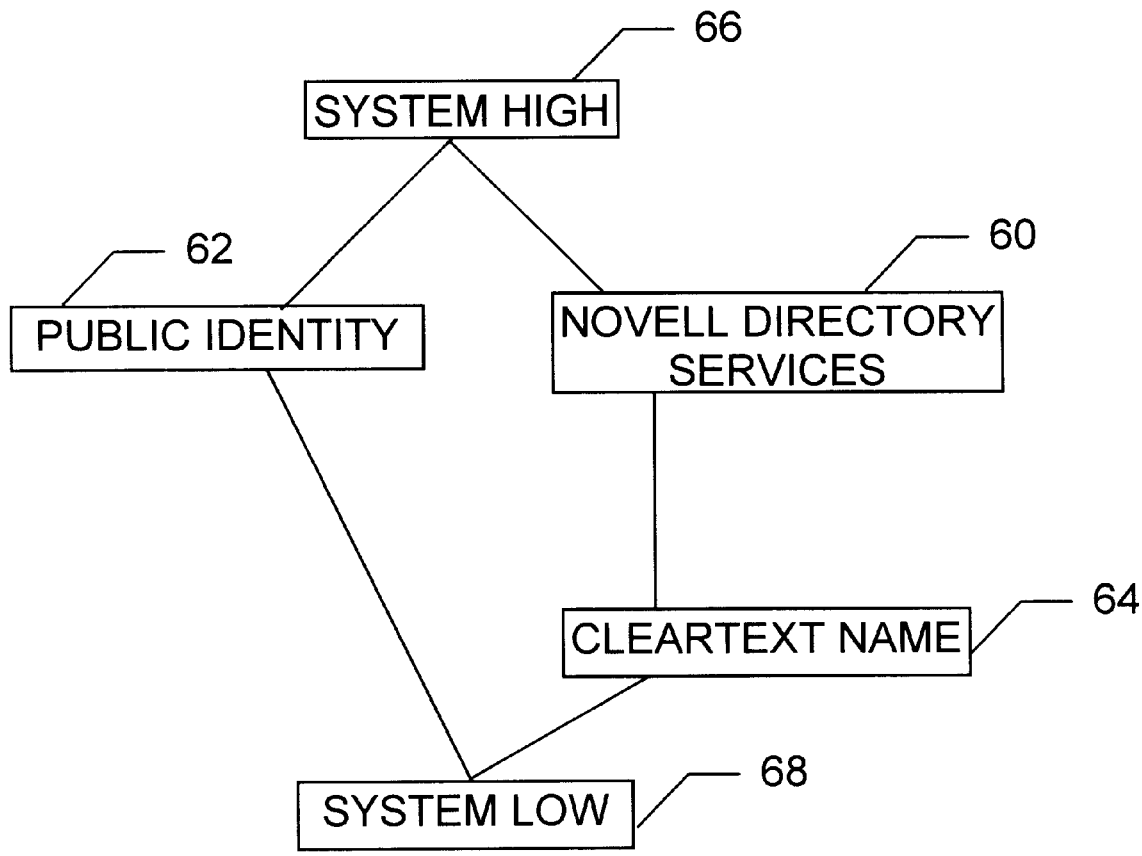
FIG. 4 is a diagram illustrating a partially ordered collection of authentication grades according to the present invention.
Figure 5:
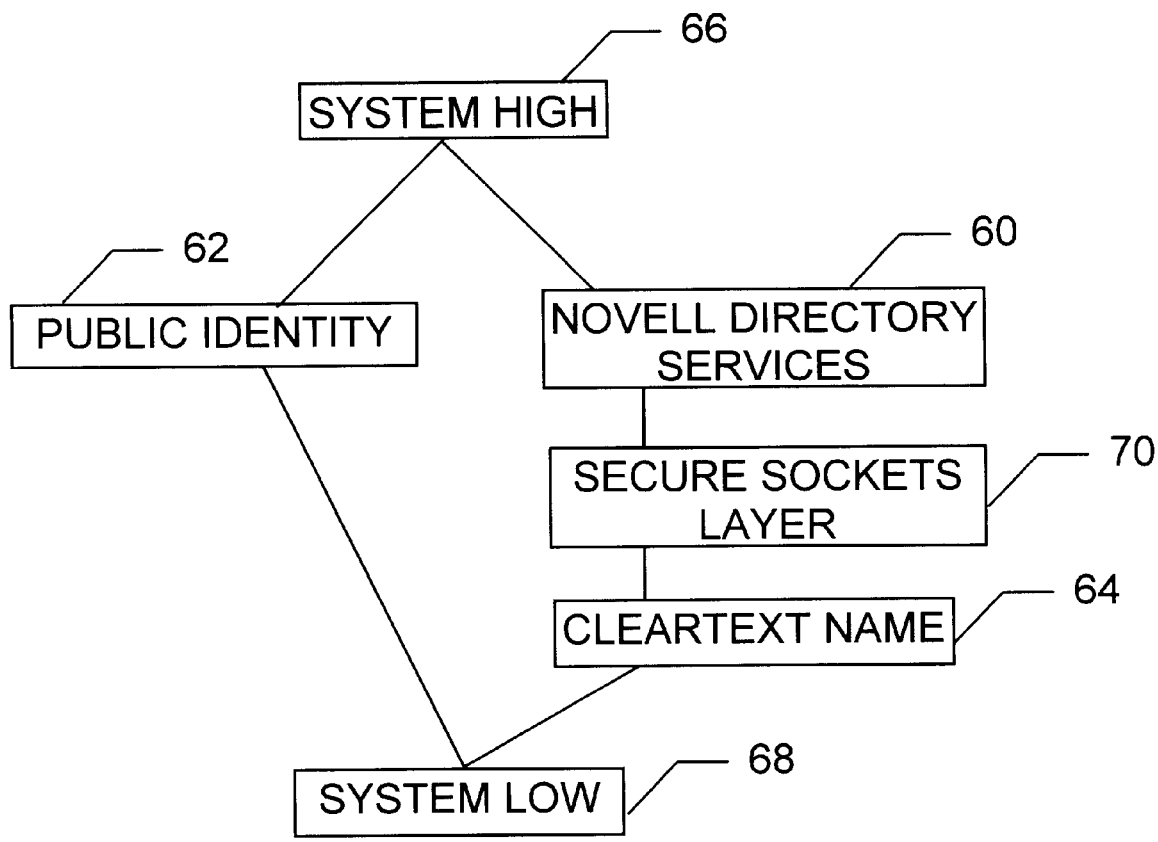
FIG. 5 is a diagram illustrating an extension of the partially ordered collection in FIG. 4 to include an additional authentication grade.

FIGS. 4 and 5 illustrate results of the associating step 34 in one embodiment of the invention. Authentication grades are represented by partially ordered lattice elements 60 through 70. A "partial ordering" is an ordering of authentication grades in which each grace is either less than, greater than, or not comparable to, each other grade.

It may be convenient to have a highest grade which is greater than every other grade, and a similar lowest grade which is less than every other grade. One or two internal system grades with no associated real-world authentication procedure may be added if necessary to occupy the highest and lowest positions in the partial ordering. In FIGS. 4 and 5, the System High grade 66 and the System Low grade 68 are such internal grades. In other embodiments, no System High grade and/or no System Low grade are employed.

A "total ordering" is a special case of a partial ordering, in which each grade is either less than or greater than each other grade. "Partial ordering" thus includes orderings in which at least two grades are not comparable, and also includes total orderings.

In presently preferred embodiments of the invention, the partial ordering is unchangeable, in the sense that altering the less than/greater than/incomparable relationship of any two authentication grades requires reconfiguring the security of the system, is not routine, and can be performed only by authorized system security personnel such as the network administrator. In such cases, changing the partial ordering imposed or the authentication grades may require changing at least one previously assigned classification level; classification levels are discussed below.

FIG. 5 illustrates the partially ordered authentication grades of FIG. 4 after an additional authentication procedure has been associated with its own additional authentication grade 70; the partial ordering has been extended to include the additional authentication grade 70. Such extensions are preferably accomplished only by authorized security personnel, but may be routine for such personnel and do not require denial of access to the system 10 while the extension is being made.

Returning to FIG. 2, during a clearance label assigning step 36, the clearance level(s) of the user(s) and/or task(s) are identified and embodied in a suitable data structure. A user and/or task may nave a single clearance level, a range of clearance levels, or even a list of clearance level ranges. The clearance level(s) may be associated with a task rather than a user if the task does not operate directly on behalf of any user. Clearance levels may be defined by a clearance administrator according to familiar criteria, such as those employed under mandatory access control. The defined clearance level(s) are then embodied in a label or other form and stored with or otherwise associated with the user or task in question. One suitable label format is discussed below in connection with FIG. 6, and those of skill in the art will readily create or identify other suitable embodiments.

During a classification label assigning step 38, the classification level of the information object to which access is sought is identified and similarly embodied in a suitable data structure. The same label format may be used to embody clearance labels and classification labels, or different formats may be used. Classification label values are preferably not changed once assigned to an information object; persistent object label values provide the system with a quality known as the "tranquility property" which is generally desirable. Classification levels may be defined and assigned by a classification administrator according to familiar criteria, such as those employed under mandatory access control.

The classification administrator and the clearance administrator may, of course, exercise their rights and duties under other titles, such as "network administrator," "security officer," or the like. The classification administrator and the clearance administrator may be the same person, two different persons, or a larger group of persons, depending on who ultimately exercises the rights and duties of those administrative roles.

Figure 3:
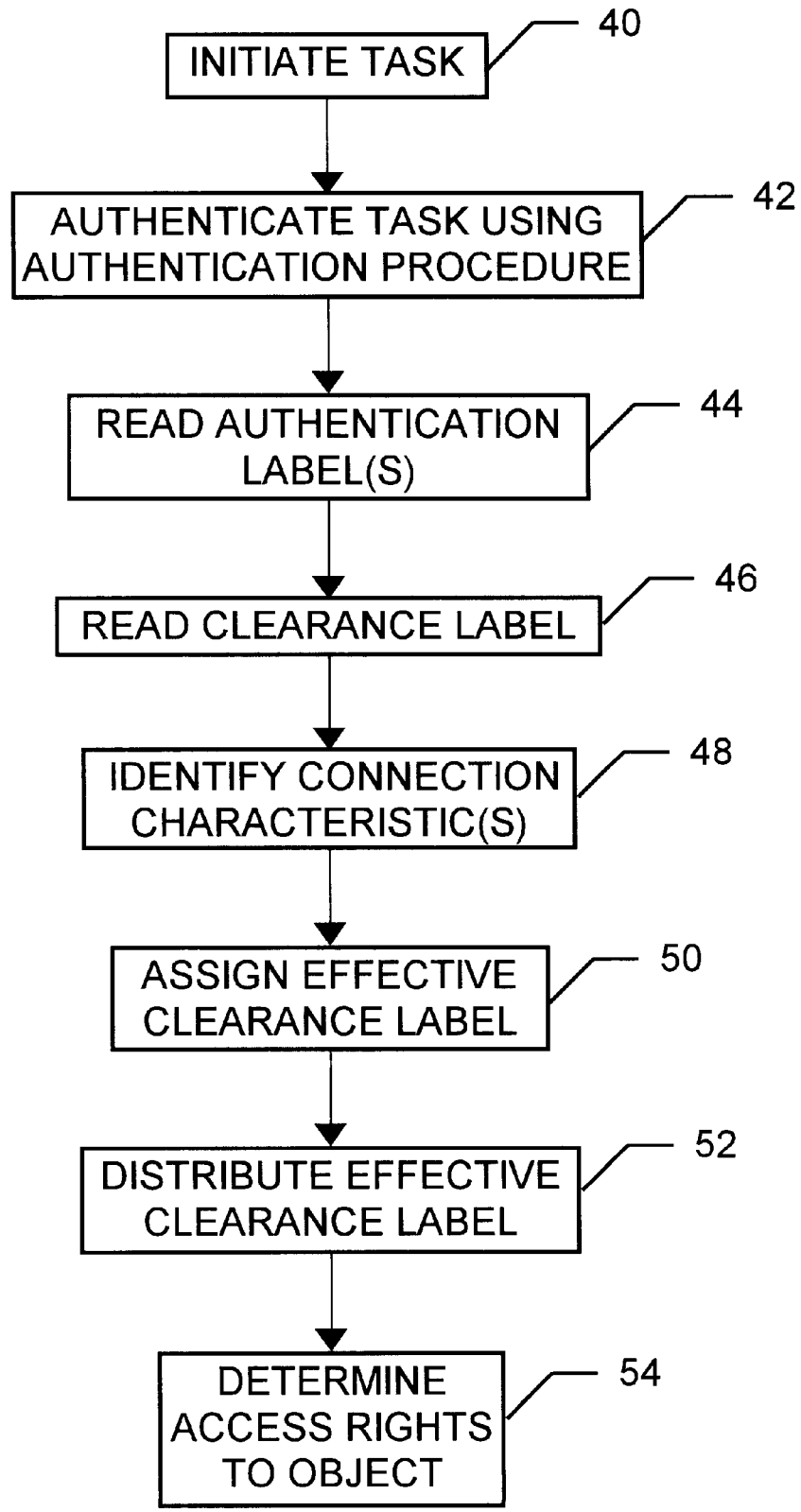
FIG. 3 is a flowchart illustrating a method for enforcing security restrictions in part or all of a computer system configured according to the present invention.

FIG. 3 illustrates a method of the invention for controlling information access after the system 10 has been configured. During an initiating step 40, a task is initiated through familiar steps such as random access memory allocation and instruction pointer initialization. A "task" includes any one or more of the following: a process servicing a connection request for a client, a server-based process such as a NetWare Loadable Module ("NLM") process, another system process, an application program, a daemon, a thread, or any other unit of executable software. Tasks may reside on, and the invention may be used on, client-server networks, peer-to-peer networks, local area networks, wide area networks, intranets, value-added networks, global networks, other networks, mainframes, embedded computer systems, real-time control systems, standalone computer systems, or other computer systems.

The task is authenticated during an authenticating step 42. A given task may operate directly on behalf of a particular user, in which case "authenticating the task" involves determining the identity of the user for whom the task operates. A "user" is a human. A given task may also operate directly on behalf of some component of the computer system, and thus operate indirectly on behalf of users of the system. In this latter case, "authenticating the task" means determining the identity of the present task, and possibly also determining the identity of one or more ancestor tasks which created or initiated one another in a chain or web leading to the present task.

The task is authenticated using either a familiar authentication procedure or one which is not yet known but provides a means for verifying the identity of a task or the identity of a user on whose behalf a task is initiated. Many authentication procedures are commercially available, including those used by Novell's NetWare Directory Services software, by Novell's NetWare network operating system, by the Netscape Secure Sockets Layer software, by Lightweight Directory Access Protocol software, by password-based login software, by cleartext name login software, and by public and/or private key encryption software.

During reading steps 44 and 46, software and/or computer hardware embodying the invention reads the labels containing the authentication grades and clearance level(s) of the authentication procedure and the user(s) on behalf of whom the task operates. A user and/or task may have a single clearance level, a range of clearance levels, or even a list of clearance level ranges. Alternatively, the clearance level(s) of the task itself are identified if the task does not operate directly on behalf of any user.

During an optional connection characteristic identifying step 48, one or more characteristics of the user's connection to the system 10 (FIG. 1) are identified. Characteristics of the connection may include any or all of the following: socket identity; port identity; physical device identity, such as LAN identity, source address, router identity, or routing path; and connection characteristics listed in the Technical Background or elsewhere herein.

Although the steps 42 through 48 are shown in a particular order for clarity of illustration, it will be appreciated that their actual order of execution may vary. In general, any two steps of any method of the invention may be reordered or performed concurrently unless one of the steps provides information or otherwise prepares the way for the other step, which then necessarily follows the preparing step.

During an effective clearance label assigning step 50, one or more labels embodying the effective clearance of the task (or user) is assigned, stored with the task, or otherwise associated with the task or user in question. The effective clearance is based on the clearance assigned during the step 36 and the authentication grade associated with the authentication procedure used during the step 42.

The assigning step 50 may take the authentication grade into account by using the minimum of the authentication grade and a clearance level in the clearance label as an effective clearance level. Alternatively, the effective clearance level(s) may be a predetermined amount less than the assigned clearance level(s) (step 3E), or may be obtained by table lookup as a function of the authentication grade.

Conditions involving the other available information, including without limitation the connection characteristics, may also be used in determining the effective clearance level(s). For instance, an effective clearance level may be set to a hypothetical Level Seven if the authentication grade is less than Novell Directory Service authentication, if the user's identified clearance level(s) are above Level Seven, or if the user is connected to the network 10 through a phone line that does not appear on a list of secure lines.

To promote consistency of access rights throughout the network 10 (FIG. 1), an effective clearance label containing the results of the assigning step 50 is preferably distributed to other servers 16 (FIG. 1) during a distributing step 52. Distribution is accomplished using connections, packets, and/or other familiar data transmission means.

The distributed effective clearance may be structured in various ways, but must specify at least the current access rights of the task. For instance, the effective clearance may include the current clearance label of a regular (single-level) task, or the current nontrivial clearance range of a trusted task.

Unlike conventional credentials or clearances, an effective clearance label according to the present invention reflects the authentication grade of the authentication procedure that was used to authenticate the task in question. Uniformity of access rights may not be possible with a given network, but the distributing step 52 may also be used to distribute the effective clearance label to a subset of servers in the system 10.

During a determining step 54, the access rights of the task and/or user with respect to a particular information object or class of information objects is determined. This determination depends on at least the results of the classification label assigning step 38 and the effective clearance label assigning step 50. If the optional connection characteristic identifying step 48 is performed, the results of that step 48 may also affect the determining step 54. In one embodiment, the determining step 54 determines both read access rights and write access rights; in other embodiments, only read rights or write rights are determined.

The determining step 54 proceeds according to a policy. One suitable policy implements the familiar Bell-LaPadula model, which may be summarized by the rules "No read up" and "No write down." That is, the task cannot read from information objects that are more sensitive, and cannot write to objects that are less sensitive, than the sensitivity level (effective clearance level(s)) of the task itself. Sensitivity levels of tasks and objects conventionally correspond to clearance levels and classification levels, respectively. According to the present invention, the sensitivity level of a task also reflects the authentication grade of the authentication procedure by which the task entered the system 10 (FIG. 1), with higher grades potentially granting or allowing higher sensitivity levels and vice versa.

A policy may also, or in the alternative, implement the familiar Biba interpretation of the Bell-LaPadula model, which may be summarized by the rules "No read down" and "No write up." That is, the task cannot read from information objects that are less sensitive, and cannot write to objects that are more sensitive, than the sensitivity level of the task itself. The Bell-LaPadula model is directed to protecting the secrecy of information, while the Biba interpretation is directed to protecting the integrity of information. MAC-based policies can be used in conjunction with DAC constraints to determine access rights.

In one embodiment, a directory services schema global area is used to hold policy definitions, but those of skill will recognize that other approaches are also possible under the invention.

Integrity and secrecy sensitivities may be embodied in an instance of a general label. One suitable format 80 for a general label is illustrated in FIG. 6. Those of skill in the art will appreciate that many other general label data structure formats, and other label data structure formats specifically for clearance or authentication grade or classification or effective clearance or combinations thereof, may also be employed according to the present invention. Corresponding human-readable labels are preferably also provided in a system configured according to the invention.

The general label structure 80 shown in FIG. 6 contains thirty-two bytes of data or reserved space. This format allows a total of 256 secrecy levels, 256 integrity levels, 96 secrecy categories, and 64 integrity categories. In addition, 65,536 singleton secrecy categories and 65,536 singleton integrity categories can be defined. Singleton categories cannot be used in conjunction with each other, but may be used with other categories. Categories indicate a "need to know." Categories are either the same or not comparable. Any two category sets may be equal, or disjoint, or one may be a proper subset of the other.

Bytes zero and one of the general label 80 are indicated at 82 in FIG. 6. Byte zero specifies the general label's type, which indicates whether a label value has been assigned to an object or task or authentication grade bearing an instance of the label 80 or otherwise associated with such an instance. Unmounted volumes and label instances apparently containing corrupted data may also be indicated. Byte one indicates the size of a label instance for internal memory management purposes.

One of the four bytes indicated at 84 indicates the secrecy level, and another indicates the integrity level. The other two bytes are reserved. Bytes 6 and 7 are also reserved, as indicated at 86 in FIG. 6. Two of the bytes indicated at 88 specify the singleton secrecy categories and the other two bytes specify the singleton integrity categories. Four of the bytes indicated at 90 specify additional secrecy categories and four of the bytes indicated at 92 specify additional integrity categories. The other bytes indicated at 90 and 92 are reserved.

Returning to FIG. 3, when evaluating labels to determine whether to deny a requested access, the determining step 54 preferably considers the relationship between the specific label instances involved. For instance, it may depend in whole or in part on whether one label dominates another label, that is, whether the level(s) embodied in one label dominate the level(s) embodied in the other label.

One policy allows a given task to read a given information object only if the secrecy portion of the task's label dominates the secrecy portion of the object's label and the integrity portion of the task's label is dominated by the integrity portion of the object's label. The policy allows a given task to write a given information object only if the secrecy portion of the task's label is equal to the secrecy portion of the object's label and the integrity portion of the task's label is equal to the integrity portion of the object's label. Other policies require other relationships.

A particular user or task may be marked as trusted by being assigned two different labels which define an effective clearance range. One policy allows a trusted task to read a given information object only if the maximum secrecy portion of the trusted task's labels dominates the secrecy portion of the object's label and the minimum integrity portion of the trusted task's labels is dominated by the integrity portion of the object's label. The policy allows a trusted task to write a given information object only if the secrecy portion of the object's label is contained within the secrecy portion of the trusted task's range and the integrity portion of the object's label is contained within the integrity portion of the trusted task's range. Other policies require other relationships.

In summary, the present invention provides a novel approach of associating authentication grades with the basic aspects of mandatory access control (clearance and classification level enforcement) and which allows the use of access control lists and other discretionary access controls within secure confines. The invention also allows system administrators to implement a consistent system-wide policy by distributing effective clearance labels and policy definitions. Policies may conform with familiar models such as Bell-LaPadula and its Biba interpretation, and/or other requirements such as DAC constraints. Trusted tasks may be given broader access than other tasks. Perhaps most importantly, the authentication procedures used to access the system can be graded and the grades are taken into consideration to modify or override conventional mandatory or discretionary access control features.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for controlling access by a task to an information object in a computer network, the task having been previously authenticated by an authentication procedure to act on behalf of a user, the computer-implemented method comprising the steps of:

associating an authentication grade with the authentication procedure; and determining the access rights of the task with respect to the information object based at least on the authentication grade; and then distributing an effective clearance label, after which the effective clearance label resides on a plurality of server computers in the computer network.

2. The method of claim 1, wherein each of at least two authentication procedures is associated with its own distinct authentication grade, and a partial ordering is imposed on the authentication grades.

3. A computer-implemented method for controlling access by a task to an information object in a computer network, the task having been previously authenticated by a first authentication procedure to act on behalf of a user, the computer-implemented method comprising the steps of:

associating a first authentication grade with the first authentication procedure;

associating a second authentication grade with a second authentication procedure; and determining the access rights of the task with respect to the information object based at least on the first authentication grade, wherein one of the authentication procedures has stronger cryptography than the other authentication procedure, and of the two procedures, the associating steps associate a higher authentication grade with the authentication procedure that has stronger cryptography.

4. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level and the classification level, wherein each of at least two authentication procedures is associated with its own distinct authentication grade, a partial ordering is imposed on the authentication grades, and the tranquility property is maintained over the partial ordering in the computer network.

5. The method of claim 4, wherein the associating step associates a plurality of authentication procedures with the same authentication grade.

6. The method of claim 4, wherein an additional authentication procedure is associated with its own additional authentication grade, and the partial ordering is extended to include the additional authentication grade.

7. A computer-implemented method for controlling access by a task to an information object in a computer network the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, one authentication procedure has stronger cryptography than another authentication procedure, and of the two procedures, the associating step associates a higher authentication grade with the authentication procedure that has stronger cryptography.

8. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, one authentication procedure reviews a user identity certificate and another authentication procedure does not, and of the two procedures, the associating step associates a higher authentication grade with the authentication procedure that reviews the user identity certificate.

9. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, one authentication procedure requires a hardware token and another authentication procedure does not, and of the two procedures, the associating step associates a higher authentication grade with the authentication procedure that requires the hardware token.

10. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, one authentication procedure verifies that trusted hardware and/or trusted software is in use and another authentication procedure does not, and of the two procedures, the associating step associates a higher authentication grade with the authentication procedure that verifies such use.

11. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein one of the authentication grades is associated with a directory service authentication procedure.

12. A computer-implemented method for controlling access by a task to an information object in a computer network the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein one of the authentication grades is associated with a Secure Sockets Layer authentication procedure.

13. A computer-implemented method for controlling access by a task to an information object in a computer network the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein one of the authentication grades is associated with a cleartext name authentication procedure.

14. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the task is connected to the computer network by a connection, the method further comprises the computer-implemented step of identifying at least one characteristic of the connection, and the determining step determines the access rights of the task with respect to the information object based at least on the authentication grade, the clearance level, the classification level, and at least one characteristic of the connection.

15. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, and marking the task as a trusted task by assigning a nontrivial clearance range to the task.

16. The method of claim 4, wherein the clearance level may not be changed without authorization from the clearance administrator and the classification level may not be changed without authorization from the classification administrator.

17. A computer-implemented method for controlling access by a task to an information object in a computer network the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the clearance level and the classification level are each stored as an instance of the same label structure.

18. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the computer system includes a computer network, the determining step is followed by the computer-implemented step of distributing an effective clearance label, after which the effective clearance label resides on a plurality of server computers in the computer network.

19. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the effective clearance label specifies the current nontrivial clearance range of the task.

20. A computer-implemented method for controlling access by a task to an information object in a computer network, the task having been previously authenticated by an authentication procedure to act on behalf of a user, the computer-implemented method comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein a plurality of server computers in the computer network are configured such that the user has the same access rights to the information object on each of those server computers.

21. The method of claim 4, wherein the determined read access rights conform with the Bell-LaPadula model.

22. The method of claim 4, wherein the determined write access rights conform with the Biba interpretation of the Bell-LaPadula model.

23. The method of claim 4, wherein the authentication grade is partially ordered with respect to at least one other authentication grade, and each authentication grade specifies the highest level any task authenticated by the procedure associated with the grade may read and also specifies the lowest level any task authenticated by the procedure associated with the grade may write.

24. A computer network comprising:
at least one information object;
authentication means for authenticating a task to execute on at least a portion of the computer network on behalf of a user;
execution means capable of executing the task, including memory and at least one processor;
association means for associating an authentication grade with the authentication means;
clearance identification means for identifying at least one clearance level previously assigned to the user by a clearance administrator;
classification identification means for identifying at least one classification level previously assigned to the information object by a classification administrator; and
determination means for determining the access rights of the task with respect to the information object based at least on the authentication grade, the clearance level, and the classification level,
wherein each of at least two authentication means is associated with its own distinct authentication grade, a partial ordering is imposed on the authentication grades by the association means, the network comprises an additional authentication means, the association means associates the additional authentication means with its own additional authentication grade, and the partial ordering is extended to include the additional authentication grade.

25. A computer network comprising:
at least one information object;
authentication means for authenticating a task to execute on at least a portion of the computer network on behalf of a user;
execution means capable of executing the task, including memory and at least one processor;
association means for associating an authentication grade with the authentication means;
clearance identification means for identifying at least one clearance level previously assigned to the user by a clearance administrator;
classification identification means for identifying at least one classification level previously assigned to the information object by a classification administrator; and
determination means for determining the access rights of the task with respect to the information object based at least on the authentication grade, the clearance level, and the classification level,
wherein each of at least two authentication means is associated with its own distinct authentication grade, one authentication means uses stronger cryptography than another authentication means, and the association means associates a higher authentication grade with the authentication means that uses stronger cryptography.

26. A computer network comprising:
at least one information object;
authentication means for authenticating a task to execute on at least a portion of the computer network on behalf of a user;
execution means capable of executing the task, including memory and at least one processor;
association means for associating an authentication grade with the authentication means;
clearance identification means for identifying at least one clearance level previously assigned to the user by a clearance administrator;
classification identification means for identifying at least one classification level previously assigned to the information object by a classification administrator; and
determination means for determining the access rights of the task with respect to the information object based at least on the authentication grade, the clearance level, and the classification level, wherein each of at least two authentication means is associated with its own distinct authentication grade one authentication means verifies that trusted hardware and/or trusted software is in use and another authentication means does not, and the association means associates a higher authentication grade with the authentication means that verifies such use.

27. A computer network comprising:

at least one information object;

authentication means for authenticating a task to execute on at least a portion of the computer network on behalf of a user;

execution means capable of executing the task, including memory and at least one processor;

association means for associating an authentication grade with the authentication means;

clearance identification means for identifying at least one clearance level previously assigned to the user by a clearance administrator;

classification identification means for identifying at least one classification level previously assigned to the information object by a classification administrator; and determination means for determining the access rights of the task with respect to the information object based at least on the authentication grade, the clearance level, and the classification level, wherein the authentication means includes means for performing a network operating system authentication procedure.

28. A computer network comprising:

at least one information object;

authentication means for authenticating a task to execute on at least a portion of the computer network on behalf of a user;

execution means capable of executing the task, including memory and at least one processor;

association means for associating an authentication grade with the authentication means;

clearance identification means for identifying at least one clearance level previously assigned to the user by a clearance administrator;

classification identification means for identifying at least one classification level previously assigned to the information object by a classification administrator; and determination means for determining the access rights of the task with respect to the information object based at least on the authentication grade, the clearance level, and the classification level, wherein the authentication means includes means for performing a Secure Sockets Layer authentication procedure.

29. A computer network comprising:

at least one information object;

authentication means for authenticating a task to execute on at least a portion of the computer network on behalf of a user;

execution means capable of executing the task, including memory and at least one processor;

association means for associating an authentication grade with the authentication means;

clearance identification means for identifying at least one clearance level previously assigned to the user by a clearance administrator;

classification identification means for identifying at least one classification level previously assigned to the information object by a classification administrator; and determination means for determining the access rights of the task with respect to the information object based at least on the authentication grade, the clearance level, and the classification level, wherein the task is connected to the computer network by a connection, the computer network further comprises means for identifying at least one characteristic of the connection, and the determination means determines the access rights of the task with respect to the information object based at least on the authentication grade, the clearance level, the classification level, and at least one characteristic of the connection.

30. A computer network comprising:

at least one information object;

authentication means for authenticating a task to execute on at least a portion of the computer network on behalf of a user;

execution means capable of executing the task, including memory and at least one processor;

association means for associating an authentication grade with the authentication means;

clearance identification means for identifying at least one clearance level previously assigned to the user by a clearance administrator;

classification identification means for identifying at least one classification level previously assigned to the information object by a classification administrator; and determination means for determining the access rights of the task with respect to the information object based at least on the authentication grade, the clearance level, and the classification level, further comprising means for marking the task as a trusted task by assigning a nontrivial effective clearance range to the task.

31. A computer network comprising:

at least one information object;

authentication means for authenticating a task to execute on at least a portion of the computer network on behalf of a user;

execution means capable of executing the task, including memory and at least one processor;

association means for associating an authentication grade with the authentication means;

clearance identification means for identifying at least one clearance level previously assigned to the user by a clearance administrator;

classification identification means for identifying at least one classification level previously assigned to the information object by a classification administrator;

determination means for determining the access rights of the task with respect to the information object based at least on the authentication grade, the clearance level, and the classification level; and distribution means for distributing an effective clearance label of the task so that the effective clearance label resides on a plurality of server computers in the computer network.

32. The computer network of claim 24, wherein the determination means determines read access rights according to the Bell-LaPadula Model.

33. The computer network of claim 24, wherein the determination means determines write access rights according to the Biba interpretation of the Bell-LaPadula Model.

34. A computer storage medium having a configuration that represents data and instructions which will cause at least a portion of a computer network to perform method steps for controlling access by a task to an information object in the computer network after task has been authenticated by an authentication procedure to act on behalf of a user, the method steps comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the task is connected to the computer network by a connection, the method further comprises the computer-implemented step of identifying at least one characteristic of the connection, and the determining step determines the access rights of the task with respect to the information object based at least on the authentication grade, the clearance level, the classification level and at least one characteristic of the connection.

35. The computer storage medium of claim 34, wherein each of at least two authentication procedures is associated with its own distinct authentication grade, and a partial ordering is imposed on the authentication grades.

36. A computer storage medium having a configuration that represents data and instructions which will cause at least a portion of a computer network to perform method steps for controlling access by a task to an information object in the computer network after task has been authenticated by an authentication procedure to act on behalf of a user, the method steps comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, a partial ordering is imposed on the authentication grades, one authentication procedure has stronger cryptography than another authentication procedure, and of the two procedures, the associating step associates a higher authentication grade with the authentication procedure that has stronger cryptography.

37. A computer storage medium having a configuration that represents data and instructions which will cause at least a portion of a computer network to perform method steps for controlling access by a task to an information object in the computer network after task has been authenticated by an authentication procedure to act on behalf of a user, the method steps comprising the steps of:

associating an authentication grade with the authentication procedure, identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein each of at least two authentication procedures is associated with its own distinct authentication grade, a partial ordering is imposed on the authentication grades, and one of the authentication grades is associated with at least one of a directory service authentication procedure and a network operating system authentication procedure.

38. A computer storage medium having a configuration that represents data and instructions which will cause at least a portion of a computer network to perform method steps for controlling access by a task to an information object in the computer network after task has been authenticated by an authentication procedure to act on behalf of a user, the method steps comprising the steps of:

associating an authentication grade with the authentication procedure;

identifying at least one clearance level previously assigned to the user by a clearance administrator;

identifying at least one classification level previously assigned to the information object by a classification administrator; and determining the access rights of the task with respect to the information object based at least on the authentication grade, the clearance level, and the classification level, wherein the determining step is followed by the computer-implemented step of distributing an effective clearance label, after which the effective clearance label resides on a plurality of server computers in the computer network.

39. The computer storage medium of claim 34, wherein the determined read access rights conform with the Bell-LaPadula Model.

40. The computer storage medium of claim 34, wherein the determined write access rights conform with the Biba interpretation of the Bell-LaPadula model.

* * * * *